(No Model.) 2 Sheets—Sheet 1.
L. SMITH.
APPARATUS FOR STORING AND PRESERVING FOOD.
No. 446,025. Patented Feb. 10, 1891.
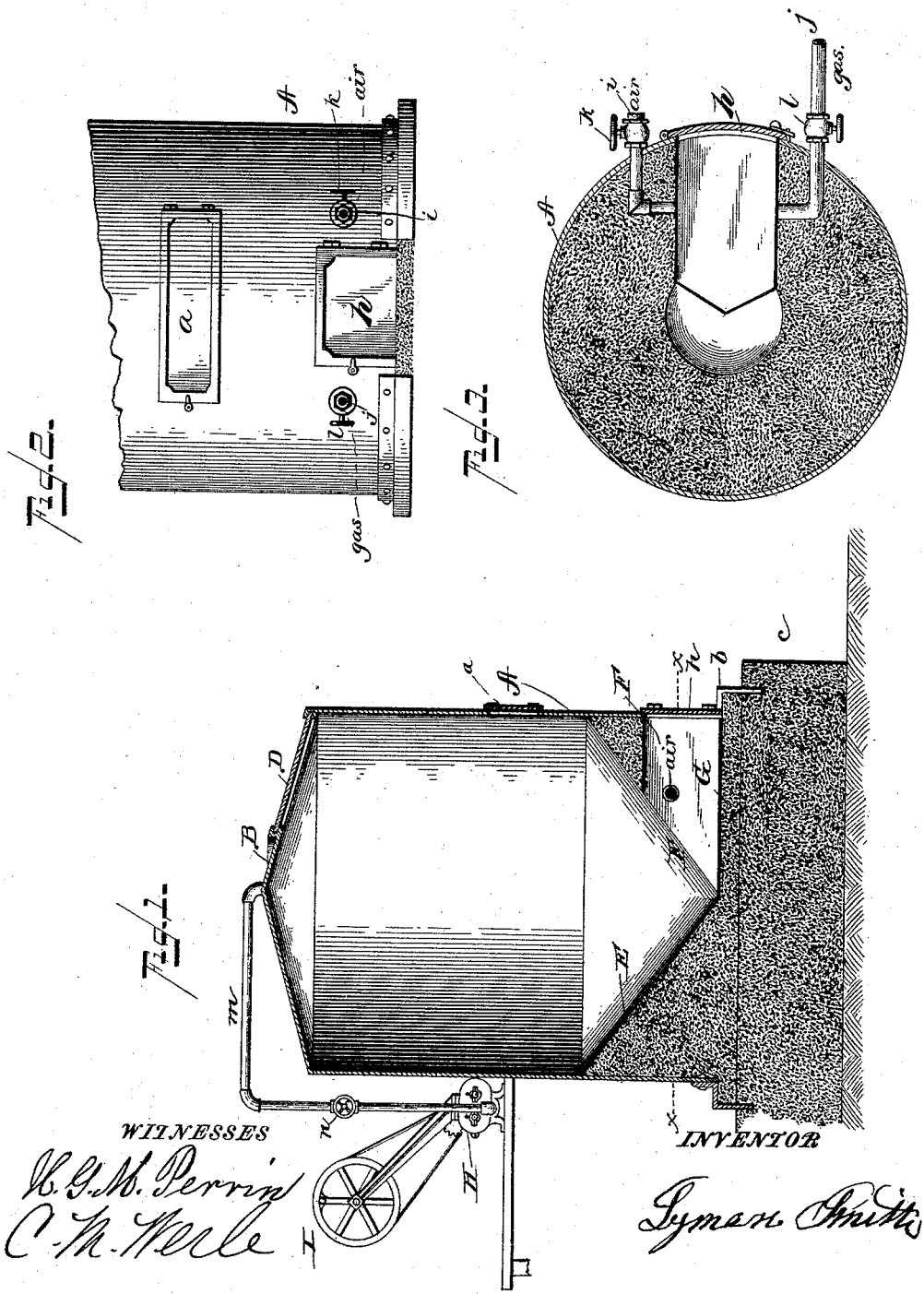
WITNESSES
INVENTOR
Lyman Smith (No Model.) 2 Sheets—Sheet 2.
L. SMITH.
APPARATUS FOR STORING AND PRESERVING FOOD.
No. 446,025. Patented Feb. 10, 1891.
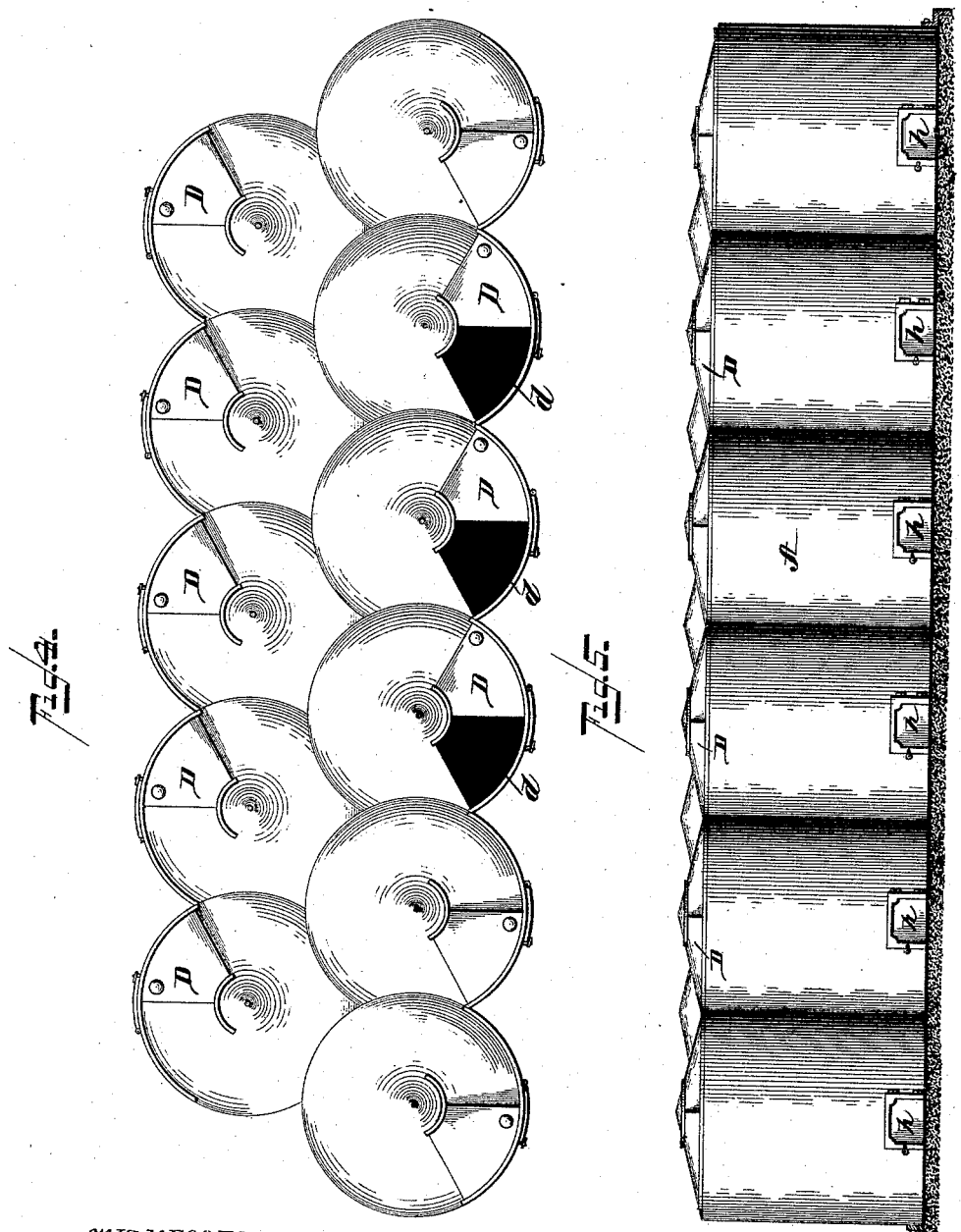
WITNESSES
INVENTOR
Lyman Smith

UNITED STATES PATENT OFFICE.

LYMAN SMITH, OF CHICAGO, ILLINOIS, ASSIGNOR TO THE SMITH PNEUMATIC TRANSFER AND STORAGE COMPANY, OF WEST VIRGINIA.

APPARATUS FOR STORING AND PRESERVING FOOD.

SPECIFICATION forming part of Letters Patent No. 446,025, dated February 10, 1891.

Application filed May 3, 1890. Serial No. 350,493. (No model.)

*To all whom it may concern:*

Be it known that I, LYMAN SMITH, a citizen of the United States, residing at Chicago, in the county of Cook and State of Illinois, have invented certain new and useful Improvements in Means for Storing and Preserving Food Products; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Referring to the drawings, Figure 1 is a vertical section of a storage-tank embodying my invention. Fig. 2 is an elevation thereof, the upper portion being broken away, and Fig. 3 is a section taken on line $x\ x$ of Fig. 1. Fig. 4 is a top plan view, and Fig. 5 is an elevation of a group of tanks such as shown in Fig. 1.

This invention relates to the storage and preservation of food products; and it consists in structural features and combinations of parts as will now be fully described, reference being had to the drawings, in which—

A indicates a cylindrical plate-metal shell open at its lower end and closed at its upper end by a conical dome or roof B, provided with a sliding gate D, adapted to hermetically close the charging-aperture $d$, for which said gate is provided, a second opening, closed by a door $a$, being provided in the cylindrical portion of the tank, so that access may be had thereto at different elevations for convenience of filling the tank. The lower end of the shell incloses a bottom of cement concrete, as shown at $e$, in which is formed a recess or depression E, having the form of an inverted cone, the greatest diameter of which is equal to the inner diameter of the shell, said depression forming the bottom for the tank. A lateral passage F, in which is fitted a box G, having a suitable door $h$, communicates with the conical bottom of the tank, and through said boxed-in passage the contents of the tank are removed.

The object of forming the bottom of the tank in the form of an inverted cone is to facilitate the remove of the contents of the tank without entering the same, which would otherwise be necessary, so that any portion or the entire contents may be removed through the same opening, thus also avoiding the necessity of a number of doors at different elevations. A further advantage is derived from this construction—namely, that but little air will enter the tank on opening the door $h$ so long as the mouth of the passage F is covered with the articles stored, and when carbonic-acid gas is substituted for the air in a freshly-filled tank there will be but a small loss of this gas on opening the door $h$ for the removal of a portion of the contents of the tank.

In order to more firmly secure the tank to its foundation, I provide an annular anchor-bearing $b$ therefor that is Z-shaped in cross-section, one of the vertical flanges of the bearing being riveted to the tank, the web and the other vertical flange of said bearing being embedded in the concrete $e$, substantially as described in my application for Letters Patent of even date with this.

The upper end of the tank is connected by a pipe $m$ with an exhaust-blower H, said pipe $m$ having a suitable valve $n$, and said blower being driven from any suitable power, as at I. Two pipes $i$ and $j$, provided with valves $k$ and $l$, respectively, open into the lateral passage F through the box G, the pipe $i$ serving to admit air to the tank, and may, if desired, be adapted for coupling with a source of air-supply. The pipe $j$ is intended for connection with a source of carbonic-acid-gas supply.

The object of the air-pipe is to draw air through the tank when it is found necessary to first dry such products as have become damp from any cause before exhausting the air from the tank and substituting carbonic-acid gas therefor.

In Figs. 4 and 5 I have shown a group of tanks constructed for interconnection substantially as described in my aforesaid application for patent.

The object of this invention is to provide a simple and economical means, whereby farmers and others may store and preserve the products of the farm for an indefinite period of time, so as to enable them to realize the greatest possible benefit from their labors.

In Letters Patent of the United States granted to me July 7, 1885, No. 321,769, I have described a method of curing grain by first passing air therethrough and then exhausting the air from the receptacle in which such grain is stored, and in Letters Patent of the United States granted to me January 4, 1887, No. 355,480, I have shown and described means for exhausting the air from the storage-chamber and replacing it by carbonic-acid gas. I have found, however, that with some food products either of these methods is insufficient for their preservation. This is especially the case with fruits and other food products containing more or less saccharine juices. In order to preserve this class of food products, I first draw air through the storage-tank, so as to thoroughly dry off all superficial moisture. I then exhaust the air from the storage-tank, and when nearly exhausted admit carbonic-acid gas, so that as the heavier gas is drawn in and is taking the place of the lighter gas—namely, the air—the latter is displaced by the carbonic-acid gas, so as to completely fill all the vacant space of the tank. Every article or particle of matter stored will thus be surrounded by the preservative agent, so that neither fermentation nor injury to the contents of the tank by insects or animaculæ present before storage can take place.

Having described my invention, what I claim, and desire to secure by Letters Patent, is—

1. A storage-tank for food products, consisting of a plate-metal tank adapted to be hermetically closed and provided with suitable gates or doors, in combination with independent air and carbonic-acid-gas conduits having their outlets at or near the bottom of the tank, and an air-exhaust apparatus connected with the tank at top, substantially as and for the purposes specified.

2. A storage-tank for food products, consisting of a plate-metal tank adapted to be hermetically closed, a concrete bottom for said tank having the form of an inverted cone, and a discharge-duct adapted to be hermetically closed, said duct communicating with said bottom, in combination with means, substantially such as described, for admitting air and carbonic-acid gas to the tank at the bottom and exhausting the air at the top, substantially as and for the purposes specified.

3. A storage-tank consisting of a shell having a filling-opening and provided with a concrete bottom within said shell, having a central conical depression and a transverse discharge-duct, substantially as and for the purposes specified.

4. A storage-tank consisting of a shell having a filling-opening and provided with a concrete bottom within said shell, having a central conical depression and a transverse discharge-duct, in combination with an exhaust-pipe at the top of said tank, and an air-inlet pipe and carbonic-acid-gas-inlet pipe at opposite sides of the transverse discharge-duct, substantially as and for the purposes described.

In testimony whereof I affix my signature in presence of two witnesses.

LYMAN SMITH.

Witnesses:
JOHN MORIARTY,
ALEXANDER ASHLEY.